(12) United States Patent
Bar-Ilan et al.

(10) Patent No.: US 11,940,935 B2
(45) Date of Patent: Mar. 26, 2024

(54) APPARATUS, METHOD AND COMPUTER PROGRAM PRODUCT FOR EFFICIENT SOFTWARE-DEFINED NETWORK ACCELERATED PROCESSING USING STORAGE DEVICES WHICH ARE LOCAL RELATIVE TO A HOST

(71) Applicant: MELLANOX TECHNOLOGIES, LTD., Yokneam (IL)

(72) Inventors: Eliav Bar-Ilan, Or Akiva (IL); Oren Duer, Kohav Yair (IL); Maxim Gurtovoy, Tel Aviv (IL); Liran Liss, Misgav (IL); Aviad Shaul Yehezkel, Yoqneam Illit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/234,189

(22) Filed: Apr. 19, 2021

(65) Prior Publication Data
US 2022/0334989 A1 Oct. 20, 2022

(51) Int. Cl.
*G06F 13/28* (2006.01)
*G06F 9/455* (2018.01)
*G06F 13/42* (2006.01)
*G06F 15/173* (2006.01)

(52) U.S. Cl.
CPC .......... *G06F 13/28* (2013.01); *G06F 9/45558* (2013.01); *G06F 13/4221* (2013.01); *G06F 13/4282* (2013.01); *G06F 15/17331* (2013.01); *G06F 2009/45583* (2013.01); *G06F 2213/0024* (2013.01); *G06F 2213/0026* (2013.01)

(58) Field of Classification Search
None
See application file for complete search history.

(56) References Cited

U.S. PATENT DOCUMENTS

| 7,721,068 | B2 * | 5/2010 | Lowe | G06F 12/1081 |
| | | | | 710/36 |
| 8,402,201 | B2 * | 3/2013 | Flynn | G06F 12/0804 |
| | | | | 711/E12.103 |
| 10,162,793 | B1 * | 12/2018 | Bshara | H04L 69/16 |
| 10,216,423 | B1 * | 2/2019 | Malwankar | G06F 3/064 |
| 10,853,277 | B2 * | 12/2020 | Liang | G06F 13/28 |
| RE48,736 | E * | 9/2021 | Fujimoto | G06F 3/00 |
| 2008/0005495 | A1 * | 1/2008 | Lowe | G06F 12/1081 |
| | | | | 711/E12.067 |

(Continued)

OTHER PUBLICATIONS

"CUDA Toolkit Documentation," NVIDIA Corporation, last updated Apr. 15, 2021, 1 page [retrived online from: docs.nvidia.com/cuda/#standard-dma-transfer-example-sequence].

(Continued)

*Primary Examiner* — Henry Tsai
*Assistant Examiner* — Christopher A Bartels
(74) *Attorney, Agent, or Firm* — Sheridan Ross P.C.

(57) ABSTRACT

A computerized system operating in conjunction with computerized apparatus and with a fabric target service in data communication with the computerized apparatus, the system comprising functionality residing on the computerized apparatus, and functionality residing on the fabric target service, which, when operating in combination, enable the computerized apparatus to coordinate access to data.

28 Claims, 6 Drawing Sheets

(56) References Cited

U.S. PATENT DOCUMENTS

| | | | | |
|---|---|---|---|---|
| 2011/0035522 | A1* | 2/2011 | Tan | G06F 13/28 |
| | | | | 711/100 |
| 2011/0219208 | A1* | 9/2011 | Asaad | G06F 9/06 |
| | | | | 712/12 |
| 2017/0075934 | A1* | 3/2017 | Moehler | G06F 16/2219 |
| 2017/0286363 | A1* | 10/2017 | Joshua | G06F 3/0688 |
| 2018/0213669 | A1* | 7/2018 | Kochukunju | G06F 9/45558 |
| 2019/0146682 | A1* | 5/2019 | Subramanian | G06F 3/0661 |
| | | | | 711/103 |
| 2019/0163364 | A1* | 5/2019 | Gibb | G06F 13/4295 |
| 2019/0297015 | A1* | 9/2019 | Marolia | H04L 45/742 |
| 2019/0303019 | A1* | 10/2019 | Sunata | G06F 3/0679 |
| 2020/0065269 | A1* | 2/2020 | Balasubramani | G06F 13/1668 |
| 2020/0167082 | A1* | 5/2020 | Subramanian | G06F 3/0659 |
| 2020/0183864 | A1* | 6/2020 | Zhou | H04N 19/423 |
| 2020/0319812 | A1* | 10/2020 | He | G06F 3/0604 |
| 2020/0319972 | A1* | 10/2020 | Tang | G06F 3/0659 |
| 2021/0073148 | A1* | 3/2021 | Zhou | H04N 19/423 |
| 2021/0081148 | A1* | 3/2021 | Xiao | G06F 3/0649 |
| 2021/0150074 | A1* | 5/2021 | Niell | G06F 21/602 |
| 2021/0255784 | A1* | 8/2021 | Anchi | G06F 3/0689 |
| 2021/0342071 | A1* | 11/2021 | Puhov | G06F 3/064 |
| 2022/0029929 | A1* | 1/2022 | Jain | H04L 63/101 |
| 2022/0075747 | A1* | 3/2022 | Shuler | G06F 13/4221 |
| 2022/0155969 | A1* | 5/2022 | Subramanian | G06F 3/0661 |
| 2022/0164303 | A1* | 5/2022 | Raghav | G06F 12/0871 |
| 2022/0206721 | A1* | 6/2022 | Xiao | G06F 3/0679 |
| 2022/0206958 | A1* | 6/2022 | LeMay | G06F 12/0831 |
| 2022/0206962 | A1* | 6/2022 | Kim | G06F 13/102 |
| 2022/0244870 | A1* | 8/2022 | Duan | G06F 3/0673 |
| 2022/0327071 | A1* | 10/2022 | Zhou | G06F 13/4282 |
| 2022/0334932 | A1* | 10/2022 | Das Sharma | G06F 13/4273 |
| 2022/0334995 | A1* | 10/2022 | Das Sharma | G06F 13/405 |
| 2022/0342840 | A1* | 10/2022 | Das Sharma | G06F 13/4295 |
| 2022/0342841 | A1* | 10/2022 | Choudhary | G06F 13/4221 |
| 2022/0391341 | A1* | 12/2022 | Rosenbaum | G06F 15/17331 |

OTHER PUBLICATIONS

"HowTo Configure NVMe over Fabrics (NVMe-oF) Target Offload," Mellanox Technologies, Dec. 5, 2018, 6 pages [retrieved online from: community.mellanox.com/s/article/howto-configure-nvme-over-fabrics--nvme-of--target-offload].

"In-Hardware Storage Virtualization—NVMe SNAP™ Revolutionizes Data Center Storage Composable Storage Made Simple," Mellanox Technologies, 2019, 60296SB, Rev. 1.1, 3 pages.

"NVM Express™ over Fabrics," NVM Express, Inc., Jul. 17, 2018, 51 pages [retrieved online from: https://nvmexpress.org/wp-content/uploads/NVMe-over-Fabrics-1_0a-2018.07.23-Ratified.pdf].

Alarcon "GPUDirect Storage—Early Access Program Availability," NVIDIA Corporation, Oct. 5, 2020, 2 pages [retrieved online from: developer.nvidia.com/blog/gpu-direct-storage-early-access].

Deierling "What is a SmartNIC," Mellanox, Aug. 30, 2018, 9 pages [retrieved online from: blog.mellanox.com/2018/08/defining-smartnic/].

Piercey "The NVMF Boogie: How Kubernetes and NVMF Will Rock," MediaOps Inc., Nov. 7, 2019, 8 pages [retrieved online from: devops.com/the-nvmf-boogie-how-kubernetes-and-nvmf-will-rock/].

* cited by examiner

Fig. 5a:

a. present an emulated storage device to a host

↓ b. get, from the host, requests posted on the emulated device

↓ c. parse the requests

↓ d. determine that one or more storage devices attached to the host are the source or destination of at least a portion of the data referred to by the request, and, responsively, determine that the one or more storage devices attached to the host should be involved with the request

↓ e. prepare at least one request having a local memory address, which points to the original buffer located in the host's memory, for sending to the local hardware storage device/s attached to the host

Fig. 5b:

a. recognize the request having a local memory address by recognizing new opcodes or indication within existing opcode

↓ b. accordingly, generate a conventional request (having a network address) formatted for a local storage protocol using pointers to original buffers received in the request having a local memory address

↓ c. post the conventional request (having a network address) to a locally attached storage device governed by the local storage protocol, which will cause the locally attached storage device to initiate at least one DMA transfer of data between host buffers and internal flash storage

APPARATUS, METHOD AND COMPUTER PROGRAM PRODUCT FOR EFFICIENT SOFTWARE-DEFINED NETWORK ACCELERATED PROCESSING USING STORAGE DEVICES WHICH ARE LOCAL RELATIVE TO A HOST

FIELD OF THE INVENTION

This invention relates generally to hardware storage devices, and more specifically to networked hardware storage devices.

BACKGROUND

Networked storage allows plural application/database servers to share storage on a single network attached storage (NAS) server, or on a block storage controller via a storage area network protocol (SAN). Various storage networking protocols are known to support NAS and SAN systems. The same storage boxes may support distributed files (e.g. network attached storage) and block storage protocols.

DMA (Direct Memory Access) e.g. between GPU memory and storage devices such as NVMe storage drives is known, and is described, e g., here. news.developer.nvidia.com/gpu-direct-storage-early-access/

DMA transfers are also described here: docs.nvidia.com/cuda/gpudirect-rdma/findex.html #standard-dma-transfer-example-sequence A DPU (Data Processing Unit) and direct memory access (DMA) typically comprises a platform that includes a networking interface, such as NVIDIA®'s ConnectX®, and a programmable processing module, such as ARM cores, which provides the DPU's processing power, and may be programmable. BlueField® (versions 1, 2 and 3) are all examples of state-of-the-art DPUs.

DPUs can be used as a stand-alone embedded processor, or may be incorporated into network interface controllers. For example, a DPU may be incorporated into a SmartNIC, a network interface controller used in servers such as "next-generation servers" which are a class of servers characterized by increased processor speed, enhanced management features, and greater energy efficiency, relative to other servers.

SmartNIC technology is described here: blog.mellanox.com/2018/08/defining-smartnic/

A Storage Performance Development Kit (SPDK) is a developer's kit which provides building blocks for scalable, high performance storage applications. The SPDK refers to an "NVMe over Fabrics target" which is a user space application that presents block devices over "fabrics" such as Ethernet, Infiniband or Fibre Channels.

The NVMe over fabrics specification defines subsystems that can be exported over different transports; note that both RDMA and TCP transports are supported by SPDK. The SPDK specification refers to the software that exports these subsystems as a "target" (the term used for iSCSI) and refers to the target's client as a "host". It is appreciated that the Linux kernel also implements an NVMe-oF "target" and "host".

NVM Express is, as described online here: nvmexpress.org/about, "an open collection of standards and information to fully expose the benefits of non-volatile memory in all types of computing environments, from mobile to data center. The original NVM Express Work Group . . . is the consortium responsible for the development of the NVM Express specification . . . . NVM Express standards include:

NVM Express (NVMe) Specification—The register interface and command set for PCI Express technology attached storage with industry standard software available for numerous operating systems. NVMe is widely considered the defacto industry standard for PCIe SSDs.

NVMe Management Interface (NVMe-MI) Specification—The command set and architecture for out of band management of NVM Express storage (e.g., discovering, monitoring, and updating NVMe devices using a BMC).

NVMe over Fabrics (NVMe-oF) Specification—The extension to NVM Express that enables tunneling the NVM Express command set over additional transports beyond PCIe architecture. NVMe over Fabrics technology extends the benefits of efficient storage architecture at scale in the world's largest data centers by allowing the same protocol to extend over various networked interfaces."

Ampere is an example of a state of the art graphics processing unit (GPU) microarchitecture developed by NVIDIA®, and is included in NVIDIA®'s BlueField®-2X DPU.

Architectural characteristics of a GPU may include all or any subset of the following characteristics, all of which characterize Ampere:

CUDA Compute Capability 8.0 for A100 and 8.6 for the GeForce 30 series

TSMC's 7 nm FinFET process for A100

Custom version of Samsung's 8 nm process (8N) for the GeForce 30 series

Third-generation Tensor Cores with FP16, bfloat16, TensorFloat-32(TF32) and FP64 support and sparsity acceleration Second-generation ray tracing cores; concurrent ray tracing, shading, and compute for the GeForce 30 series High Bandwidth Memory 2 (HBM2) on A100 40 GB & A100 80 GB GDDR6X memory for GeForce RTX 3090 and 3080

Double FP32 cores per SM on GA10x GPUs

NVLink 3.0 with a 50 Gbit/s per pair throughput

PCI Express 4.0 with SR-IOV support (SR-IOV is reserved only for A100)

Multi-Instance GPU (MIG) virtualization and GPU partitioning feature in A100 supporting up to seven instances PureVideo feature set K hardware video decoding with AV1 hardware decoding for the GeForce 30 series and feature set J for A100

5 NVDEC for A100

New hardware-based 5-core JPEG decode (NVJPG) with YUV420, YUV422, YUV444, YUV400, RGBA.

State of the art technology useful in conjunction with certain embodiments is described online here: devops.com/the-nvmf-boogie-how-kubernetes-and-nvmf-will-rock.

NVM Express revision 1.2.1 and prior revisions thereof are documents which define a register level interface for host software to communicate with a non-volatile memory subsystem over PCI Express (NVMe over PCIe). The specification available online at nvmexpress.org/wp-content/uploads/NVMe-over-Fabrics-1_0a-2018.07.23-Ratified.pdf defines extensions to NVMe that enable operation over other interconnects (NVMe over Fabrics).

The disclosures of all publications and patent documents mentioned in the specification, and of the publications and patent documents cited therein directly or indirectly, are hereby incorporated by reference other than subject matter disclaimers or disavowals.

SUMMARY OF THE INVENTION

According to certain embodiments, a host accesses data via an emulated storage device, which may be implemented partly in software e.g. DPU software. The emulated storage device implementation locates at least a portion of the data, accessed by the host via the emulated storage device interface, as available in an individual attached storage device from among a set of storage devices locally attached to the host, but not to the DPU.

The emulated storage device implementation in DPU software accesses the host-attached (i.e. attached to host) storage device, assisted by a fabric target service (either on host or offloaded), yielding a set of DMAs including 2-3 DMAs (aka DMA transfers aka direct memory access transfer). Or, a single direct memory access transfer may be employed e.g. as described herein.

The term "target service" or "fabric target service" or "storage target service" as used herein is typically RDMA-based and is intended to include software and/or hardware running on a storage target device, in the field of network block storage or SAN (storage area network). In SAN/network block storage terminology, the "Initiator" and "Target" may comprise two sides of such network connections: the "initiator" may be the host, typically requesting a storage service and initiating storage requests, whether read or write; and the "target" may be the storage device, servicing reads and writes sent to the target by the initiator.

According to certain embodiments, the SAN is internal, between the DPU and the host connected to the DPU by PCIe, with no network port involved.

A particular advantage of certain embodiments is that rather than developing an entirely different connectivity to enable a DPU to send requests intended for a host's local drive to the host, embodiments herein use a known service, modified as described herein, typically using a hardware offload feature to assist the host in acting as a storage target.

All or any subset of the following may characterize solutions provided in accordance with embodiments of the present invention:

a. An NVMe over Fabrics (NVMf) initiator in SmartNIC is configured to recognize (e.g. by handshake with target) or is configured to understand that a specific network NVMf subsystem target can process NVMe requests (e.g. Submission Queue Entry aka SQEs) rather than NVMf requests.

b. The NVMf initiator in SmartNic is able to compose and pass SQE to the NVMf target, e.g. with new vendor-specific opcodes.

c. The SmartNIC's storage stack is able to process the original host addresses, split them into different partial requests, and send only a suitable subset of them, rather than all of them, to the host local physical NVMe device.

d. The NVMe-oF standard is modified to add an ability to process network requests that refer to local system memory. Typically, functionality on the NVMf target (e.g. software on the target) recognizes that certain requests are NVMe SQE rather than conventional NVMf requests, either by pre-configuration of the subsystem, or by using vendor-specific opcodes to signal that this is the case, or another indication within the SQE itself.

e. The NVMf target software may skip any network data movements.

f. The NVMf target software translates vendor specific opcodes, if used, into standard opcodes.

g. The NVMf target software submits the resulting SQE to the physical NVMe drive.

Typically, a vendor-specific NVMe opcode is used to indicate a data request e.g. as described herein. Vendor specific READ/WRITE commands may be defined. In an NVMf implementation, when such vendor specific commands arrive, the opcode is replaced to original READ/WRITE before submitting directly to the disk, including bypassing RDMA data in/out of the staging buffer.

According to certain embodiments, the existing fields 'PSDT' and 'SGL identifier' inside the SQE can be used to indicate that this SQE refers to host memory rather than network, by configuring them to values that are not "Keyd SGL Data Block descriptor", as required by a conventional NVMf request (having a network address).

At least the following embodiments are provided:

Embodiment 1. A computerized system operating in conjunction with a computerized apparatus and with a fabric target service in data communication with the computerized apparatus, the system comprising:

functionality residing on the computerized apparatus; and functionality residing on the fabric target service, which, when operating in combination, enable the computerized apparatus to coordinate access to data.

Embodiment 2. A computerized system according to any of the embodiments described herein which enables a host to access an emulated PCI storage device, by employing the computerized apparatus for coordinating execution of a host request arriving on an emulated interface, using less than 3 direct memory access (DMA) transfers, wherein the host request pertains to data stored or which is to be stored on at least one hardware storage device locally attached to the host, wherein the data passes between the host's original application buffer and the hardware storage device locally attached to the host.

Embodiment 3. A computerized system according to any of the embodiments described herein wherein the functionality residing on the computerized apparatus is operative to perform at least one of:

a. present an emulated storage device to a host;

b. get, from the host, requests posted on the emulated device;

c. parse the requests;

d. determine that one or more storage devices attached to the host are the source or destination of at least a portion of the data referred to by the request, and, responsively, determine that the one or more storage devices attached to the host should be involved with the request; and e. prepare at least one request having a local memory address, which points to the original buffer located in the host's memory, for sending to the hardware storage device/s attached to the host.

Embodiment 4. A computerized system according to any of the embodiments described herein wherein the request having a local memory address is formatted for a network storage protocol, and wherein the functionality residing on the fabric target service is operative to:

a. recognize the request having a local memory address by recognizing new opcodes or indication within existing opcode; and/or b. accordingly, generate a conventional request formatted for a local storage protocol using pointers to original buffers received in the request having a local memory address; and/or c. post the conventional request to a locally attached storage device governed by the local storage protocol, which will cause the locally attached storage device to initiate at least one DMA transfer of data between host buffers and internal flash storage.

Thus, typically, the target service creates a request (aka "conventional" request) with local host memory addresses, not network address/es, that is later posted on the physical real NVMe device.

Embodiment 5. A computerized system according to any of the embodiments described herein wherein the computerized apparatus includes a storage device emulator which emulates a storage device on a PCIe bus; and the fabric target service, and wherein the storage device emulator comprises a drive emulator which emulates a drive on a PCIe bus.

Embodiment 6. A computerized system according to any of the embodiments described herein wherein the drive emulator comprises an NVMe drive emulator which emulates an NVMe drive on a PCIe bus.

Embodiment 7. A computerized system according to any of the embodiments described herein wherein the NVMe drive emulator employs software-defined network accelerated processing.

Embodiment 8. A computerized system according to any of the embodiments described herein wherein the fabric target service is offered by a host locally attached to a hardware storage device and also comprising a fabric target hardware offload which performs at least some functionality on behalf of the fabric target service.

Embodiment 9. A computerized system according to any of the embodiments described herein wherein the hardware storage device comprises a physical NVMe device which is in the same pass-through domain as the emulated PCI storage device and wherein the host's original application buffer is described, both for the physical NVMe device and for the emulated PCI storage device, using the same address.

Embodiment 10. A computerized system according to any of the embodiments described herein wherein the original application buffer is part of a Virtual Machine (VM) memory space and wherein the physical NVMe device accesses the original application buffer by using PASID (Process Address Space ID) technology on the physical NVMe side.

Embodiment 11. A computerized system according to any of the embodiments described herein wherein the original application buffer is part of a Virtual Machine (VM) memory space, and wherein the physical NVMe device accesses the original application buffer by creating a input-output memory management unit (IOMMU) domain that includes all memory domains of plural virtual machines, deploying the physical NVMe device in the input-output memory management unit (IOMMU) domain, and translating at least one original address to an address which matches at least one of the plural virtual machines' memories.

Embodiment 12. A computerized system according to any of the embodiments described herein wherein the original application buffer is part of a Virtual Machine (VM) memory space, and wherein the physical NVMe device accesses the original application buffer by using ATS (Address Translation Service) to provide input-output memory management unit (IOMMU) translation of at least one address.

It is appreciated that according to certain embodiments, the emulated storage PCI device is passed to the Virtual Machine (VM), whereas the physical locally attached NVMe drive belongs to the host, not the VM.

Embodiment 13. A computerized system according to any of the embodiments described herein and wherein the local storage protocol comprises a PCI storage protocol from the following group: NVMe, Virtio-blk, Virtio-scsi, SCSI, SATA, SAS, IDE.

Embodiment 14. A computerized system according to any of the embodiments described herein and wherein the network storage protocol comprises a block storage network storage protocol.

Embodiment 15. A computerized system according to any of the embodiments described herein wherein the block storage network storage protocol comprises a remote direct memory access (RDMA) network block storage protocol from the following group: NVMe-oF; iSER; and SRP.

Embodiment 16. A method that enables a host to access an emulated PCI storage device, the method including employing a computerized apparatus for coordinating execution of a host request arriving on an emulated interface, while using less than three direct memory access (DMA)transfers, wherein the host request pertains to data stored or which is to be stored on at least one hardware storage device locally attached to the host.

Embodiment 17. A method according to any of the embodiments described herein wherein the host accesses the emulated PCI storage device using plural direct memory access transfers, and wherein the accessing includes enabling the computerized apparatus to coordinate access of the data.

Embodiment 18. A method according to any of the embodiments described herein wherein the data is stored on the storage device, and the request comprises a read request in which data is transferred, via the direct memory access transfers, from the storage device to the host.

Embodiment 19. A method according to any of the embodiments described herein wherein the request comprises a write request and the data is, via the write request, to be stored on the storage device thereby to transfer the data, via the direct memory access transfers, from the host to the storage device.

Embodiment 20. A method according to any of the embodiments described herein and wherein the accessing includes enabling the storage device emulator to coordinate access to the data by using two direct memory access transfers of the data.

Embodiment 21. A method according to any of the embodiments described herein wherein functionality residing on the storage device emulator is operative to:

a. present an emulated storage device to the host;

b. get, from the host, requests posted on the emulated device;

c. parse the requests; and d. prepare a request formatted for a network storage protocol including a special memory key (MKEY) that points to host memory rather than to DPU memory, thereby to facilitate, within Remote Direct Memory Access (RDMA) protocol, simple copying of the data from one buffer to another in the host, without the functionality residing on the fabric target service being aware of the simple copying.

Embodiment 22. A method according to any of the embodiments described herein wherein the functionality residing on the fabric target service is operative to:

a. get the request formatted for the network storage protocol from the functionality residing on the storage device emulator;

b. effect a DMA transfer of RDMA data to a staging buffer in the host memory, which actually results in simple copying of the data from one buffer to another in the host, without the functionality residing on the fabric target service being aware of the simple copying;

c. generate a request formatted for a local storage protocol; and d. post the request formatted for a local storage protocol, generated by the fabric target service, to a locally attached hardware drive formatted for the local storage protocol, which will cause the locally attached storage device to initiate DMAs of data between host buffers and internal flash storage.

Embodiment 23. A method according to any of the embodiments described herein wherein the computerized apparatus comprises a DPU including a storage device emulator.

Embodiment 24. A method according to any of the embodiments described herein wherein the hardware storage device comprises an NVMe, and the storage device emulator of the computerized apparatus comprises an NVMe drive emulator which emulates an NVMe drive on a PCIe bus.

Embodiment 25. A method according to any of the embodiments described herein wherein the DPU locates at least a portion of the data referred to by a request, posted by a host via the emulated storage device, as available in, or targeted to, at least one storage device/s locally attached to the host, but not to the DPU.

Embodiment 26. A method according to any of the embodiments described herein wherein the DPU uses a fabric target service offered by the host to access the individual host-attached storage device, yielding a set of DMAs including at least one and no more than three DMAs.

BRIEF DESCRIPTION OF THE DRAWINGS

FIGS. 5a and 5b are simplified flowchart illustrations of algorithms which may be performed by functionality residing on the computerized apparatus and by functionality residing on the fabric target service, respectively. These methods together are intended to ensure that less than three data transfers occur. The methods pertain to write IO, but the same, mutatis mutandis, applies when the request is a read request rather than a write request. All or any appropriate subset of the illustrated operations may be performed, in any suitable order e.g. the order illustrated.

DETAILED DESCRIPTION OF THE INVENTION

For simplicity, this specification refers to NVMe by way of example. However, such references are not intended to be limiting, and, more generally, any appropriate local or PCI storage protocol may be employed.

For simplicity, this specification refers to NVMf aka NVMe-oF by way of example. However, such references are not intended to be limiting, and, more generally, any appropriate network storage protocol may be employed.

For simplicity, this specification refers to SNAP™ by way of example. However, such references are not intended to be limiting, and, more generally, any storage device emulator (e.g. a smartNIC service) which emulates an NVMe (or virtio-blk) storage PCIe device to the host by exposing a storage PCI device interface to a host (or enabling access by the host to the storage PCI device) may be employed.

The term smartNIC as used herein may include any Network Interface Card (i.e. PCIe card) that plugs into a server or storage box to enable connectivity to an Ethernet network. If DPU based, the SmartNIC, apart from providing connectivity, also implements network traffic processing on the NIC that would have had to be performed by the CPU in the case of a foundational NIC. It is appreciated that a DPU (Data Processing Unit) based SmartNIC can be ASIC, FPGA, and System-on-a-Chip (SOC) based.

References herein to "emulated" storage devices, or "emulating" a storage device are intended to include a PCI device interface which is presented to a host. Thus, a (hardware) device designed originally to function as a network device is also capable of being used as a storage device, because the device exposes, or enables access to, a storage interface. It is appreciated that if a device exposes, or enables access to, an interface of type X, that device may itself be considered as a device of type X. For example, a SmartNIC device normally has, or is expected to have, an NIC interface (and similarly, an NVMe device is expected to have an NVMe interface, and so forth), however, in practice, other interfaces may be presented because of the programmable nature of (say) the SmartNIC device which adds this flexibility or emulation ability to the hardware of the SmartNIC device.

Figure 2:
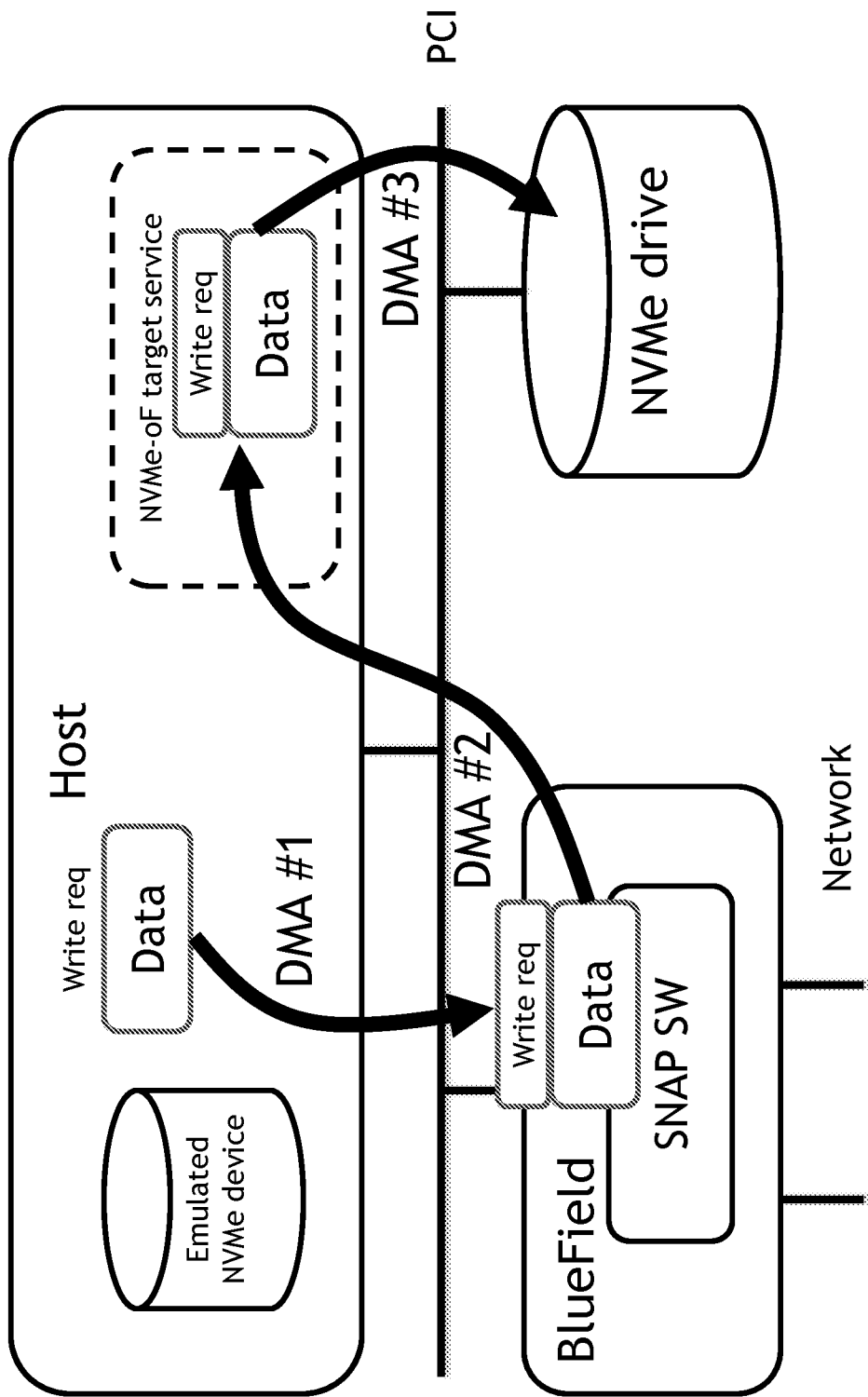
FIG. 2 is a simplified block diagram illustration of a data flow, responsive to a data request, which includes three direct memory access transfers.

In some use cases, SNAP™ which may be running on a SmartNIC may use NVMe drives that reside on the host. Conventionally, when this happens, the solution is for the host to provision the NVMe drives as network storage, and the SmartNIC then connects to that network storage, as any other network client may do. Yet, as shown in FIG. 2, this solution has the disadvantage of data transferring three times on the PCI interface; note FIG. 2 shows the following three passes over PCI:

1. Host original application buffer to SmartNIC buffer
2. SmartNIC buffer to host NVMf target staging buffer
3. Host NVMF target staging buffer to local NVMe device Certain embodiments herein seek to achieve the same functionality with only two such transfers, or even but a single PCI transfer, in which the data will pass from the host original application buffer directly to the local NVMe. Both of these possibilities yield better performance.

Certain embodiments enable a host to access an emulated PCI storage device using less than three direct memory access (DMA) transfers, by using a computerized apparatus for coordinating execution of a host request arriving on an emulated interface, wherein the host request pertains to data stored or which is to be stored on at least one local hardware storage device directly attached to the host.

The terms "local", "locally attached" and "directly attached" as used herein are intended to include situations in which a (typically hardware) storage device is available to a host, via a peripheral bus, such as a PCIe bus, whose root point is the host. In contrast, if the storage device is only available to the host via a network, then the storage device may not (e.g. even if the root is connected to the host via a second PCI bus) be regarded as local to the host, may not be regarded as locally attached to the host, and may not be regarded as directly attached to the host. Also, if the storage device is only available to the host via a PCIe bus whose root is not the host, then the storage device may not (e.g. even if the root is connected to the host via a second PCI bus) be regarded as local to the host, may not be regarded as locally attached to the host, and may not be regarded as directly attached to the host.

It is appreciated that the number of direct memory access (DMA) transfers may be discerned e.g. as follows: If there are extra PCI slots available, a PCI analyzer may be plugged to the same PCI bus as the DPU and NVMe drive associated with the transfers are connected to. Then, following a simple single read or write IO request posted on the emulated storage device, the number of DMA transfers, be they 1, 2, or 3, are clearly seen on the analyzer's output. If the CPU and NVMe drive are not both on the same PCI, two PCI analyzers may be employed, one each for the DPU and for the NVMe device. The NVMe device may be unplugged from the slot and plugged back, using existing raisers in between, and the raiser may connect also to the analyzer.

The term "local" is used herein to refer to a device (typically a hardware storage device) whose data communication with the host is not via a network, and, instead, is typically due to the device being attached, typically directly, to the host using a peripheral bus such as PCIe.

Typically the apparatus comprises a device emulator configured to emulate a storage device, such as but not limited to an NVMe storage PCIe device, to the host. The host in this embodiment may include an NVMe device, having a host NVMe driver.

Figure 1:
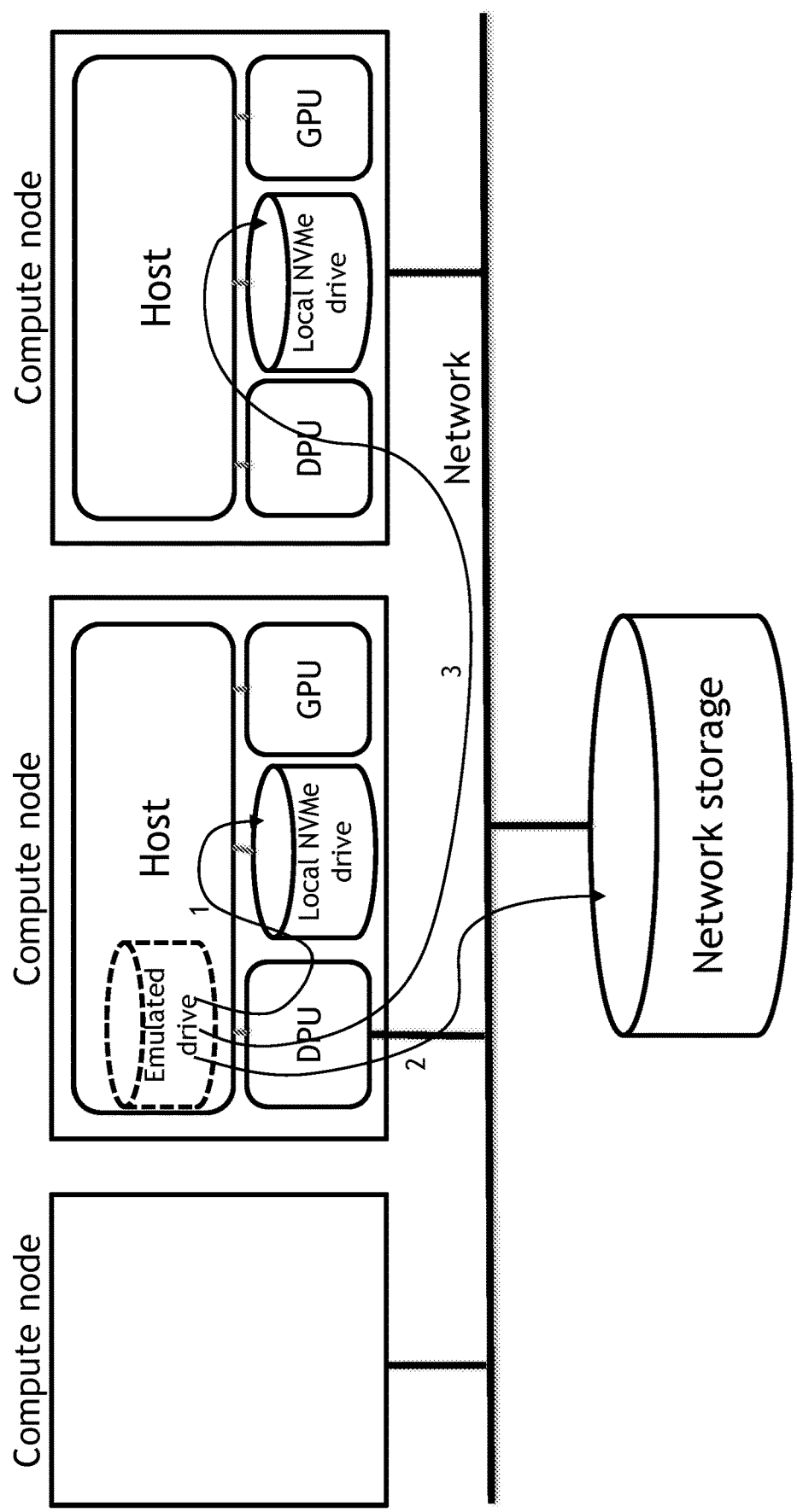
FIG. 1 is a simplified block diagram illustration of a data center environment suitable for implementing embodiments of the invention.

Embodiments of the invention are shown in FIGS. 1-4. First, FIG. 1 illustrates a data center with plural nodes. A data center may include any physical set of computer systems and/or associated telecommunications and/or storage systems. For example, in practice, certain data center/s provide Amazon web services, although from an end-users standpoint, these services are provided by a virtual machine over Internet such that the data center/s providing the service are transparent to the remote end-user consuming the service. Typically, a data center includes backup components and/or infrastructure for power supply, and/or data communication connections and/or environmental controls, such as air conditioning and/or fire suppression, and/or security devices.

Figure 3:
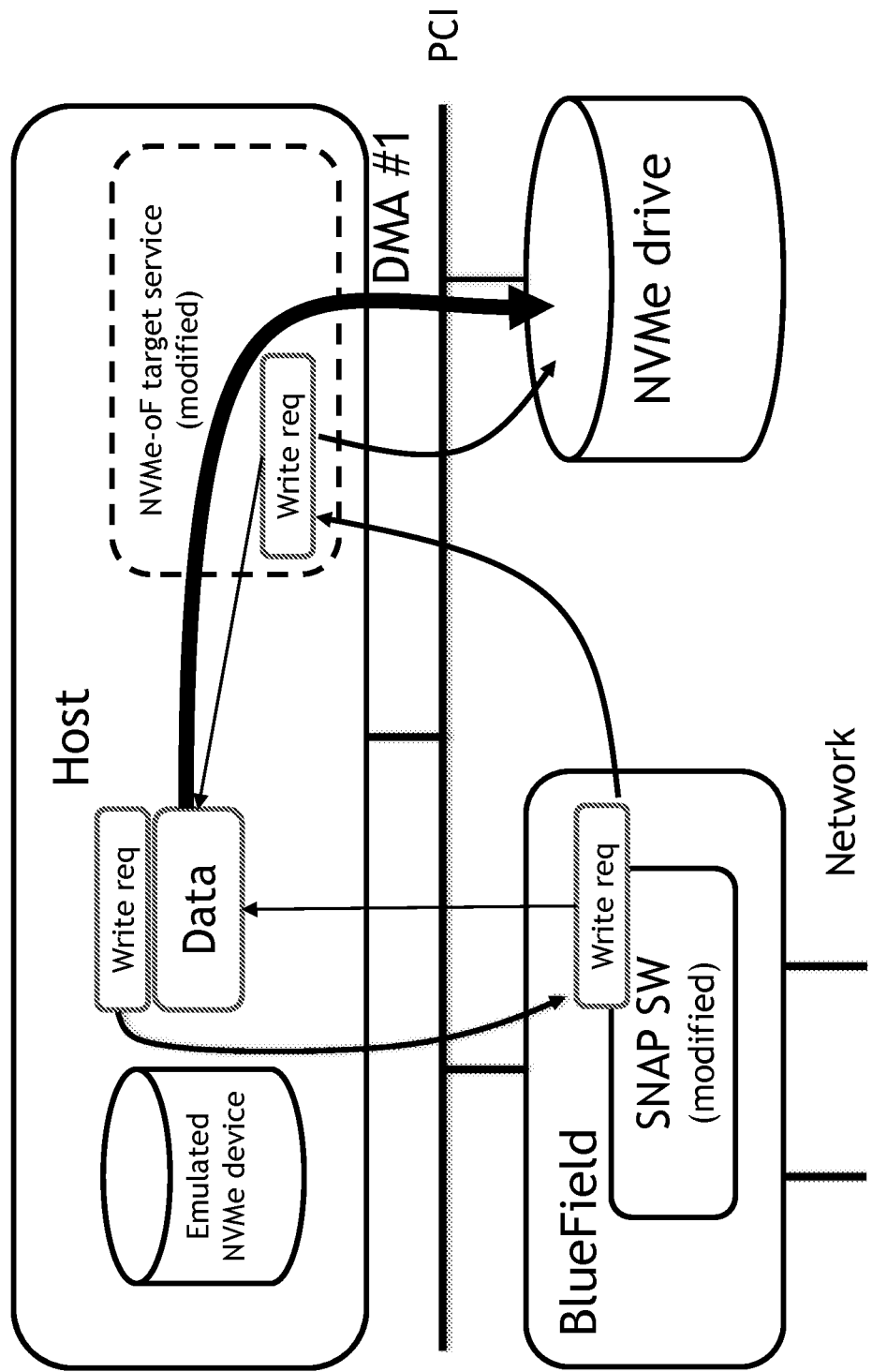
FIG. 3 is a simplified block diagram illustration of a data flow according to any embodiment of the invention which includes but a single direct memory access transfer.
Figure 4:
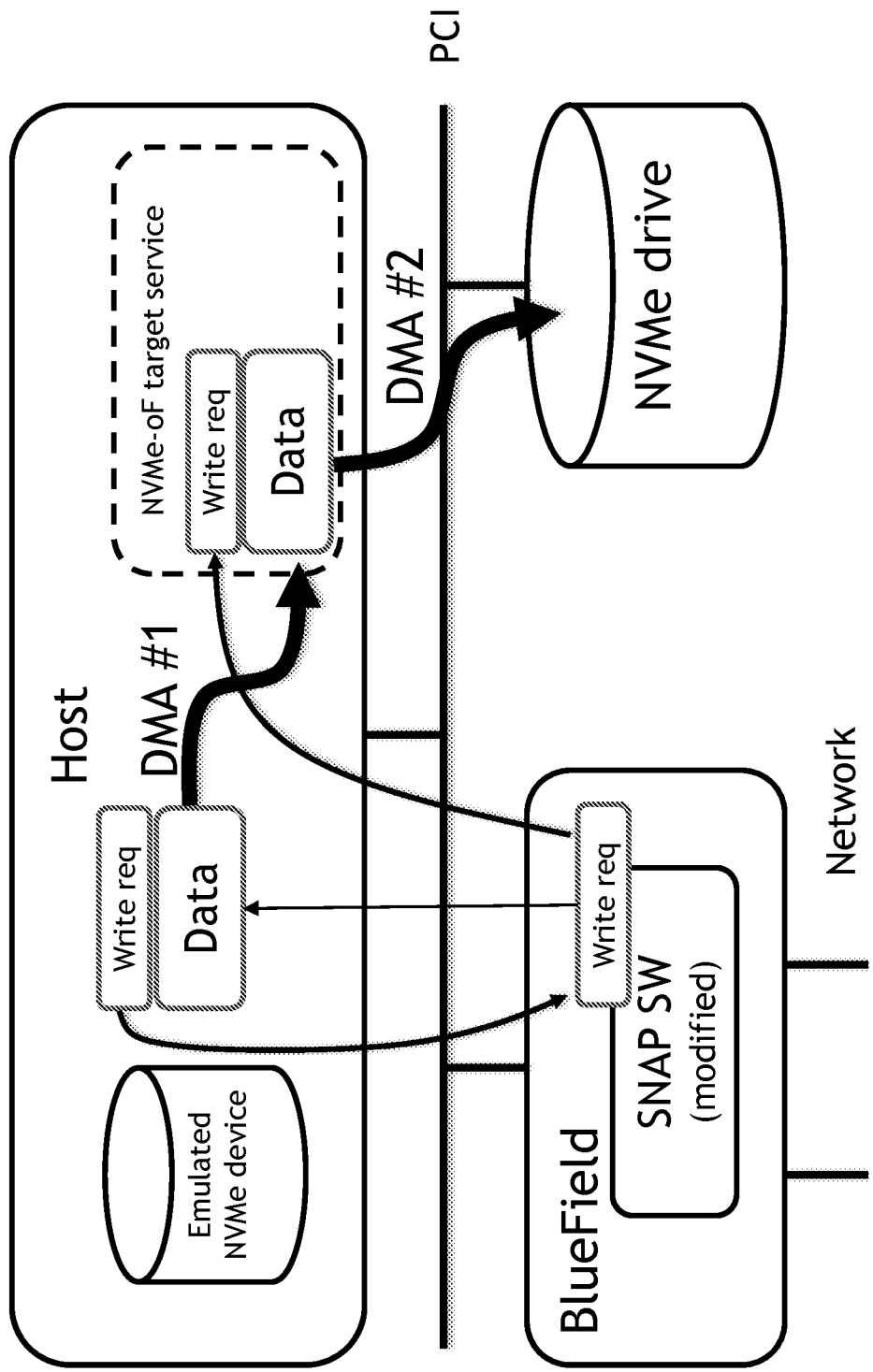
FIG. 4 is a simplified block diagram illustration of a data flow according to any embodiment of the invention which includes two, rather than three, direct memory access transfers.

Data may flow from a certain node's host to a local drive in the host's node (aka flow1), or to remote network storage (aka flow2) or to another node's drive (flow 3). FIGS. 2-4 illustrate an implementation of flow1 in which data flows from a host to a local drive (or other hardware storage device) in the host's node. It is appreciated that flow1 is particularly suited to use cases in which it is desirable for all IOs to go, first, to the emulated device, i.e. to the device presented by the DPU storage interface. Subsequently, logic on the DPU decides whether a specific request, or portions thereof, do or do not need to involve host local drive(s).

In FIG. 2, the conventional data flow, responsive to a request, includes three direct memory access transfers, indicated as DMA numbers 1, 2 and 3. For clarity, in FIGS. 2-4, the request for data is shown to be a write request, however, alternatively, the request might be a read request. It is appreciated that the target service may or may not be offloaded to hardware.

In the embodiment of FIG. 3, the aforesaid less than three direct memory access transfers comprises but a single PCI transfer, such that the data passes directly between the host's original application buffer and a hardware storage device which is local with respect to, or directly attached to, the host, the apparatus coordinating the transfer by causing the local storage device to directly access a host data buffer residing in the host, including passing a request handed to the computerized apparatus to the local storage device.

The host NVMe driver operating the SNAP™ emulated NVMe device may be, in the embodiment of FIGS. 3 and 4, the same as in FIG. 2. However, as indicated by use of the term "modified" in FIGS. 3 and 4, the flow performed by the SNAP™ and target service, typically responsive to a data request, differ from flows performed by their respective counterparts in FIG. 2, in all or any subset of the following ways:

1. SNAP™ NVMF initiator sends an NVMe request (SQE) rather than an NVMe-oF request (command capsule). Typically, the NVMe request has pointers to local system memory, created from the pointers submitted originally by the host to the SNAP™ emulated NVMe device; and/or the NVMe request uses a vendor-specific opcode instead of the standard read/write opcodes. Other alternatives (e.g. a separate pre-defined network subsystem) can be implemented, if desired.

2. NVMf target software receives a request, parses the vendor specific opcodes and deduces that this is an NVMe request rather than an NVMe-oF request, typically based on the vendor-specific opcodes (or on any other alternative, such as a separate pre-defined network subsystem, or another indication within the NVMe request).

3. NVMf target software need not perform network data movement (since data is already resident in host memory).

4. NVMf target software replaces the opcodes (which may be vendor-specific) with standard read/write opcodes, if that was the indication method, and submits such to the local NVMe device.

It is appreciated that in the embodiments of FIGS. 3 and 4, the physical NVMe device accesses the original application buffer. This may be achieved by not using any input-output memory management unit (IOMMU), or using a simple pass-through configuration of the input-output memory management unit (IOMMU), so that both the physical NVMe device and SNAP™ emulated NVMe device are in the same pass-through domain. The original application buffer can then be described, for both the physical NVMe device and SNAP™ emulated NVMe device, using the same address. In contrast, for a virtualized environment, the original application buffer is part of a Virtual Machine (VM) memory space. Therefore, a suitable option may be used to ensure that the Physical NVMe device may access the original application buffer, such as but not limited to any of the following options:

a. using PASID (Process Address Space ID) technology on the physical NVMe disk side;

b. using a physical NVMe disk that supports Virtual Functions (VFs), and placing one such VF in the same domain as the VM;

c. creating a new input-output memory management unit (IOMMU) domain that includes VM memory domains, typically all memory domains of all VMs, and putting the physical NVMe device in that domain. Then, e.g. in SNAP™ software, the original addresses may be translated to addresses that match the correct VM memory on the new domain that contains them all.

d. getting the VM memory mapping table to machine addresses into SNAP™. Then, the SNAP™ may translate the host addresses according to this mapping and use them in the physical NVMe request.

e. using ATS (Address Translation Service) to get input-output memory management unit (IOMMU) translation of the addresses.

To generate the modified target service of FIG. 3 (or FIG. 4), functionality described herein is added to a target service. To do this, a target-like subsystem may be used, say by using NVM Express consortium literature to write software which meets NVM Express standards and may run on a host system which may be in data communication with a DPU. The DPU may be plugged into a server in any suitable manner and may be connected to a host system in any suitable manner.

The NVM Express standard may be used to standardize the non-standard NVMe-oF request and allow the request to include pointers to the host memory, rather than pointers to a remote node memory. In NVMe and NVMe-oF standards, a request is defined to include either of two options to express pointers, and, if NVMe-oF RDMA is used, the addressing scheme is remote memory (which may be termed "keyed SGL" e.g. in the NVMe standard). However, removing this requirement will allow NVMe-oF RDMA protocol to pass standard local host addresses. Because the local host address is the storage system's memory, the standard may be enhanced by suitable security functionality and negotiation which allows certain addresses to be used, and forbids using certain other addresses. If the target functionality is part of the hardware offload, the internal hardware programmable CPU may be programmed to perform the target service functionality described herein.

The target service may for example run on an x86 host.

To generate the modified SNAP™ (or more generally, computerized apparatus) of FIG. 3 (or FIG. 4), tools and SDKs for developing with BlueField® may be employed to provide the functionality described herein as residing on the computerized apparatus.

According to certain embodiments, the host accesses the emulated PCI storage device may result in plural direct memory access transfers and wherein the accessing includes enabling the computerized apparatus to coordinate access of the data.

It is appreciated that a single request may span plural host connected drives. Alternatively or in addition, it is possible that less than all posted requests (e.g. requests posted by a host via an emulated storage device) should be served using a host drive, since portions of request/s may still be served from the network.

Therefore, according to an embodiment, the functionality residing on the computerized apparatus is operative to perform at least one of:
 a. present an emulated storage device to a host;
 b. get, from the host, requests which are posted on the emulated device;
 c. parse the requests;
 d. determine that one or more storage devices attached to the host are the source or destination of at least a portion of the data referred to by the request, and, responsively, determine that the one or more storage devices attached to the host should be involved with the request; and
 e. prepare at least one request having a local memory address, which points to the original buffer located in the host's memory, for sending to the local hardware storage device/s attached to the host.

It is appreciated that all or any subset of the above operations may be performed, such as but not limited to all of operations a-e, or operations a-c and e without d.

According to certain embodiments, the request having a local memory address is formatted for a network storage protocol, wherein the functionality residing on a fabric target service in data communication with the computerized apparatus is operative to:
 a. recognize the non-standard NVMF request by recognizing new opcodes or indication within existing opcode;
 b. accordingly, generate a conventional NVMe request (having a network address e.g.) formatted for a local storage protocol using pointers to original buffers received in the non-standard NVMf request; and
 c. post the conventional NVMe request to a locally attached storage device governed by the local storage protocol, which will cause the locally attached storage device to initiate at least one DMA transfer of data between host buffers and internal flash storage.

According to certain embodiments, the network storage protocol comprises a block storage network storage protocol e.g. a remote direct memory access (RDMA) network block storage protocol from, but not limited to, the following group: NVMe-oF, iSER, SRP. The local storage protocol may comprise a PCI storage protocol from, but not limited to, the following group: NVMe, Virtio-blk, Virtio-scsi, SCSI, SATA, SAS, IDE.

In the embodiment of FIG. 4, accessing includes enabling the storage device emulator to coordinate access to the data by using two direct memory access transfers of the data.

According to certain embodiments, functionality residing on the storage device emulator is operative to:
 a. present an emulated storage device to the host;
 b. get, from the host, requests posted on the emulated device;
 c. parse the requests; and
 d. prepare a request formatted for a network storage protocol including a memory key (MKEY) that points to host memory, e.g. rather than pointing to DPU memory as a conventional memory key would, thereby to facilitate, within an RDMA protocol, simple copying of the data from one buffer to another in the host, without the functionality residing on the fabric target service being aware of the simple copying.

It is appreciated that any suitable method may be employed to generate and use a memory key (MKEY) that points to host memory. For example, a suitable call to DPU (BlueField®) firmware generates an MKEY that spans another system's memory instead of the memory of the caller (e.g. of an application running on internal processing units in the DPU that stores the logic which performs the methods of FIGS. 5*a*-5*b* and/or other methods herein). This MKEY conforms to RDMA-specified MKEY requirements hence can be used just as any conventional MKEY would be used.

The functionality residing on the fabric target service is typically operative to:
 a. get the request formatted for the network storage protocol from the functionality residing on the storage device emulator;
 b. effect a DMA transfer of RDMA data to a staging buffer in host memory, which actually results in simple copying of the data from one buffer to another in the host, without the functionality residing on the fabric target service being aware of the simple copying;
 c. generate a request formatted for a local storage protocol; and
 d. post the request formatted for a local storage protocol, generated by the fabric target service, to a locally attached hardware drive formatted for the local storage protocol, which will cause the locally attached storage device to initiate DMAs of data between host buffers and internal flash storage.

Typically, the computerized apparatus comprises a DPU including a storage device emulator. The DPU may comprise a BlueField® DPU, and typically, the local storage device comprises an NVME, and the storage device emulator of the computerized apparatus comprises an NVMe drive emulator which emulates an NVMe drive on a PCIe bus. For example, the NVMe drive emulator may comprise the Mellanox NVMe SNAP™ device).

The term Software-defined Network Accelerated Processing (aka SNAP™) as used herein may include any subsystem or technology which enables hardware-accelerated virtualization of NVMe storage, making networked storage look like a local NVMe SSD, e.g. by emulating an NVMe drive or other storage device on the PCIe bus. The host OS/Hypervisor typically makes use of its conventional NVMe-driver unaware that the communication is terminated, not by a physical drive, but by the NVMe SNAP™. Any logic may be applied to the data via the NVMe SNAP™ framework and transmitted over the network, on either Ethernet or InfiniBand protocol, to a storage target.

NVMe SNAP™ allows end-users to implement their own storage solutions on top of the supplied framework. NVMe SNAP™ exposes, or enables access to, an interface to cores (e.g. provides access of the cores to the interface), such as for example BlueField® SmartNIC ARM® cores, for implementing control of the storage solution. NVMe SNAP™ is integrated with the popular Storage Performance Development Kit (SPDK) open source project, and provides customers with the agility to program in a familiar environment. Typically, end-users are provided with one or both of two data paths—the first, full-offload, makes use of a hardware-offload for NVMe SNAP™ which takes data traffic from the NVMe PCIe, converts it to NVMe-oF (e.g. RoCE (RDMA Over Converged Ethernet) or Infiniband) and transmits it directly to the network, typically all in hardware. It is appreciated that this option may lack the ability for software running on ARM cores to 'touch' the data or change the storage protocol. A second data path which may be provided enables an SPDK running on the ARM cores to terminate traffic coming from the NVMe PCIe, and may implement any customer logic on the NVMe PCIe, and then transmit the data to the network. This path, which makes use of ARM cores in data path, allows flexibility to implement any type of storage solution inline. In both of the above data path options, the control plane is typically always running in the ARM cores, orchestrating the traffic to its destination.

End-users can develop tailor-made virtualization solutions on top of BlueField® SmartNICs with the NVMe SNAP™ framework utilizing BlueField® SoC ARM cores to leverage its built-in hardware acceleration engines.

NVMe SNAP™ is characterized by all or any subset of the following:

Implements in-hardware storage virtualization
Programmable NVMe SNAP™ framework enables integration into any storage solution which may be based on any network protocol
Enables optimization of storage resources for CAPEX and OPEX savings
Free up compute node CPU resources by offloading both networking and storage data paths
Two-in-one solution which combines NVMe SNAP™ with a smart NIC such as BlueField® SmartNIC:
Dual-port 25/100 Gb/s network adapter card
BlueField® SoC: 16 ARM A72 cores
hardware offload accelerators
DDR4 memory
PCIe 3.0/4.0 interface
FHHL form factor
Use cases including all or any subset of:
Bare-metal cloud storage virtualization
Rack scaling designs with zero software impact
Introduce NVMe-oF to the enterprise with no OS type/version dependency
Data centers get better server utilization, allowing more virtual machines and more tenants on the same hardware, while reducing the TCO, power consumption and cabling complexity.

NVMe SNAP™ may for example be based on Mellanox BlueField® technology which combines hardware-accelerated storage virtualization with the advanced networking and programmability capabilities of the BlueField® SmartNIC. Mellanox BlueField® SmartNIC with NVMe SNAP™ serves as a smart network adapter for both storage and network virtualization simultaneously, thereby to provide in-hardware storage virtualization to improve both storage and networking infrastructure because NVMe SNAP™ on Mellanox BlueField® enables in-hardware storage virtualization while leveraging the smart adapter's ARM programmability yielding flexibility. Customers can also make use in parallel, of the BlueField® infrastructure to implement network virtualization offloads, such as running the vSwitch control on ARM cores while offloading the data path to the ConnectX® technology in the SoC, thereby maximizing virtualization scalability and efficiency.

It is appreciated that the DPU may locate at least a portion of the data referred to by a request, posted by a host via the emulated storage device, as available in, or targeted to, at least one storage device/s which is/are locally attached to the host, but not to the DPU.

It is appreciated that the request data may not refer to host storage devices at all. Or, at least a portion of the request data (all of the request data, or only a portion thereof) may involve host storage device(s). A single host device or plural host devices may be involved for a particular request data portion (or portions).

According to certain embodiments, the DPU uses a fabric target service offered by the host to access the individual host-attached storage device, yielding a set of DMAs including 1-3 DMAs.

It is appreciated that requests may be either read requests or write requests. In the first instance, typically, the data is stored on the storage device, and the request comprises a read request in which data is transferred, via the direct memory access transfers, from the storage device to the host. However, alternatively, a given request may comprise a write request, and the data is, via the write request, to be stored on the storage device thereby to transfer the data, via the direct memory access transfers, from the host to the storage device.

According to one embodiment, the system operates in conjunction with a computerized apparatus and with a fabric target service in data communication with the computerized apparatus, and the system comprises functionality residing on the computerized apparatus, and functionality residing on the fabric target service, which, when operating in combination, enable the computerized apparatus to coordinate access to data.

Example: the computerized apparatus typically includes a storage device emulator which emulates a storage device on a PCIe bus, and the fabric target service, and the storage device emulator comprises a drive emulator which emulates a drive on a PCIe bus. The drive emulator may comprise an NVMe drive emulator which emulates an NVMe drive on a PCIe bus. Typically, the NVMe drive emulator employs software-defined network accelerated processing. The NVMe drive emulator may, for example, comprise a Mellanox NVMe SNAP™ device. Optionally, the fabric target service is offered by the host and a local hardware storage device, and is assisted by a specialized fabric target hardware offload.

Figure 6:
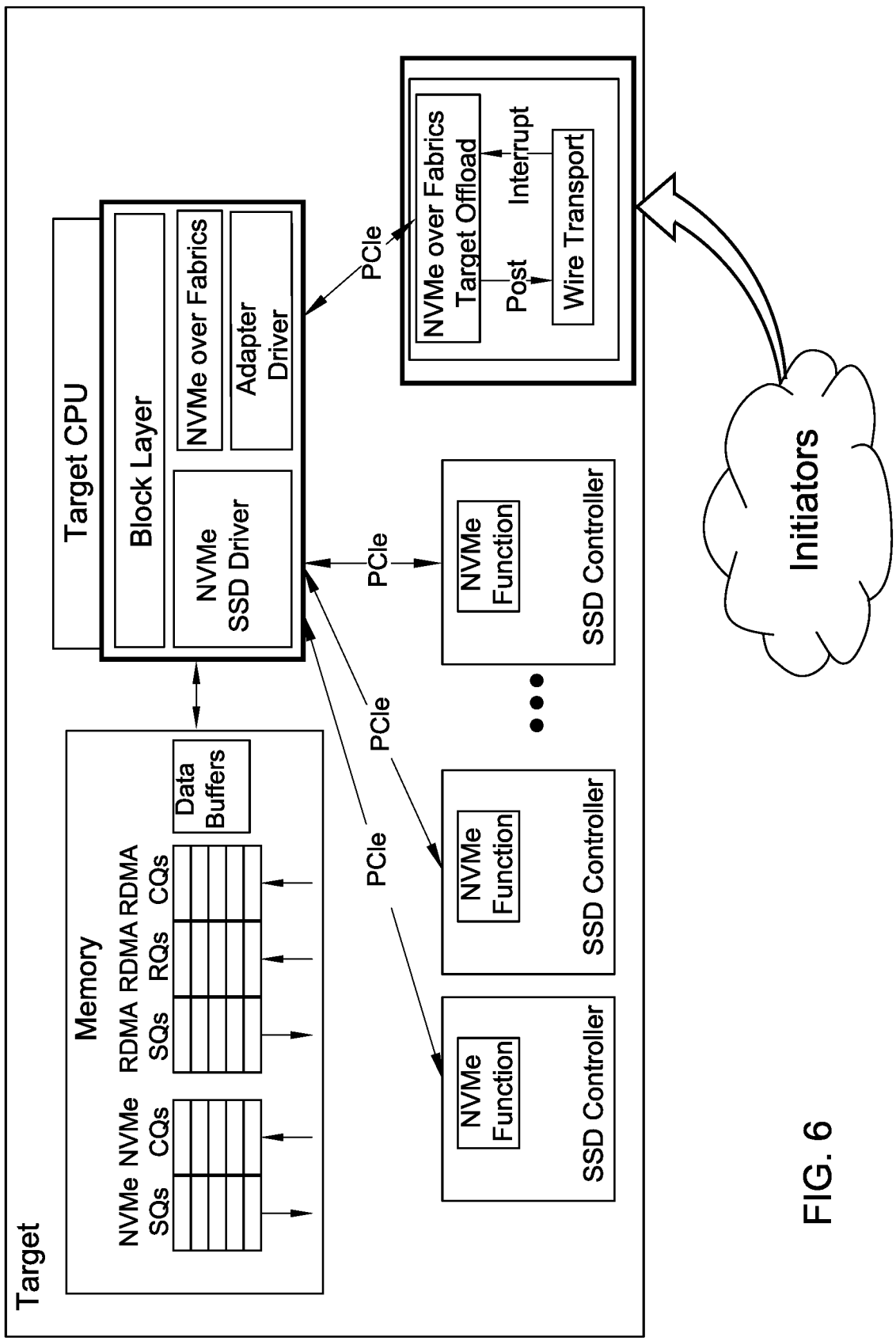
FIG. 6 is a simplified block diagram illustration of operation of a fabric target offload.

The fabric target offload may operate as per FIG. 6 wherein typically, only control path, management and exceptions go through target CPU software. Typically, data path and NVMe commands are handled by a network adaptor.

Typically, a target service is operative to present a storage system to network clients, to handle connections arriving from the clients, to handle administrative tasks (e.g. an admin command set defined in NVMe and NVMe-oF specifications), and to handle/service each IO request using configured physical drives. In a target offload feature provided in accordance with certain embodiments, the target service is offloaded to hardware which then handles/services IO requests, instead of the host doing so. Typically, the host still runs software to deal with connections and administrative tasks, and to configure the target offload feature in suitable hardware such as ConnectX®-5 and BlueField®, but, once this has been done, the task of handling each request including servicing the request using the configured physical drive, is done entirely by the hardware, whereas the host software remains responsible for exception flows, errors, disconnects, etc. Configuration of NVMe over Fabrics (NVMe-oF) Target Offload is described online, e.g. at community.mellanox.com/s/article/howto-configure-nvme-over-fabrics-nvme-of--target-offload.

It is appreciated that, generally, references herein to a drive emulator are merely exemplary, since, more generally, any storage device (not necessarily a drive) may be emulated. Also, references herein to NVMe are merely exemplary, since, more generally, any local storage protocol may be employed. Also, references herein to NVMe-oF are merely exemplary, since, more generally, any network storage protocol may be employed.

The functionality residing on the computerized apparatus, whether provided standalone or in combination with other components shown and described herein, is typically operative to perform a method (shown in FIG. 5a) including all or any subset of the following operations, suitably ordered e.g. as follows:
 a. present an emulated storage device to a host;
 b. get, from the host, requests posted on the emulated device;
 c. parse the requests;
 d. determine that one or more storage devices attached to the host are the source or destination of at least a portion of the data referred to by the request, and, responsively, determine that the one or more storage devices attached to the host should be involved with the request; and
 e. prepare at least one request having a local memory address, which points to the original buffer located in the host's memory, for sending to the local hardware storage device/s attached to the host.

The functionality residing on a fabric target service is typically operative to perform a method (shown in FIG. 5b) comprising all or any subset of the following operations, suitably ordered e.g. as follows:

a. recognize the request having a local memory address by recognizing new opcodes or indication within existing opcode;
 b. accordingly, generate a conventional request (having a network address) formatted for a local storage protocol using pointers to original buffers received in the request having a local memory address; and
 c. post the conventional request (having a network address) to a locally attached storage device governed by the local storage protocol, which will cause the locally attached storage device to initiate at least one DMA transfer of data between host buffers and internal flash storage.

The functionality on the computerized apparatus may be implemented in software, hardware, firmware, or any combination thereof. The functionality on the fabric target offload may be implemented in software, hardware, firmware, or any combination thereof.

It is appreciated that the methods of FIGS. 5a and 5b, typically taken together, are more parsimonious than the following method which results in three or more direct memory access transfers:
 i. functionality on computerized apparatus presents an emulated storage device (NVMe in this case) to the host, with help of HW capabilities
 ii. functionality on computerized apparatus gets requests from host posted on the emulated device, with help of HW capabilities
 iii. functionality on computerized apparatus parses the requests
 iv. DMAs data buffer pointed to by the request to internal DPU memory, with the help of HW capabilities (DMA #1)
 v. prepares a conventional NVMe-oF request and sends over to target service In conjunction with all or any subset of the following operations:
 Operation 1011: fabric target service functionality gets the NVMe-oF conventional request (having a network address) prepared in the above operation v Operation 1012: RDMAs data from DPU to a staging buffer in host memory (DMA #2)
 Operation 1013: fabric target service generates a conventional NVMe request
 Operation 1014: fabric target service Posts NVMe request to the locally attached real NVMe drive, drive DMAs data to internal flash storage (DMA #3)

As seen, this method results in three DMAs, thus is less parsimonious than the methods of FIG. 5a, 5b.

Many use-cases for the embodiments herein are possible, such as, for example, use-cases in which BlueField® SNAP™ (or other computerized apparatus) may seek to access host NVMe include Cache Tier, Layered Storage and Hyper Converged use cases.

According to certain non-limiting embodiments, the methods herein utilize all or any subset of the following technologies:
 NVMe
 "NVM Express (NVMe) or Non-Volatile Memory Host Controller Interface Specification (NVMHCIS) is an open logical-device interface specification for accessing non-volatile storage media attached via PCI Express (PCIe) bus. NVM stands for non-volatile memory, which is often NAND flash memory that comes in several physical form factors, including solid-state drives (SSDs), PCI Express (PCIe) add-in cards, M.2 cards, and other forms."
 Software-Defined Network Accelerated Processing NVMe SNAP™ enables hardware virtualization of NVMe storage. The Mellanox NVMe SNAP™ framework enables customers to easily integrate networked storage solutions into their cloud or enterprise server deployments. NVMe SNAP™ brings virtualized storage to bare-metal clouds and makes composable storage simple. It enables the efficient disaggregation of compute and storage to allow fully-optimized resource utilization, thereby facilitating composable storage NVMe SNAP™ empowers customers with the freedom to implement their own storage technology and solutions on top of the NVMe SNAP™ framework, which runs on the Mellanox BlueField® system on a chip controller. SNAP™ achieves both performance and software transparency by leveraging BlueField®'s embedded hardware storage acceleration engines along with integrated programmable ARM cores. This powerful combination is agile yet completely transparent to host software, allowing SNAP™ to be integrated into a wide variety of storage solutions NVIDIA® BlueField® Data Processing Units The NVIDIA® BlueField® data processing unit (DPU) ignites unprecedented innovation for modern data centers, delivering a broad range of advanced networking, storage, and security services for complex compute and AI workloads. By combining the industry-leading ConnectX® network adapter with an array of ARM cores, BlueField® offers purpose-built hardware acceleration engines with full data center infrastructure on chip programmability.

Benefits include all or any subset of:

a. data storage for the expanding workload; with NVMe over Fabric (NVMe-oF) Storage Direct, encryption, elastic storage, data integrity, compression, and deduplication, the NVIDIA® BlueField®-2 DPU provides a high-performance storage network with latencies for remote storage that rivals direct attached storage.

b. High-Performance, Efficient Networking; the BlueField®-2 DPU is a powerful data center services accelerator, delivering up to 200 gigabits per second (Gb/s) Ethernet and InfiniBand line-rate performance for both traditional applications and modern GPU-accelerated AI workloads while freeing the host CPU cores; and c. Software-Defined Infrastructure; The NVIDIA® DOCA software development kit (SDK) enables developers to easily create high-performance, software-defined, cloud-native, DPU-accelerated services, leveraging industry-standard APIs. NVMe over Fabric (aka NVMe-oF or NVMF)

Devops.com describes that "NVMe is a protocol that dictates how a CPU moves memory via the PCI bus to a storage device. NVMe communicates over a set of rings (per CPU) where commands may be submitted from any CPU to the underlying NVMe device. The design of NVMe eliminates intermediate layers between the CPU and the storage device. NVMe devices consist of a controller, queues, namespaces, namespace IDs and the actual storage media with some form of an interface. Storage media can be grouped into sections called namespaces with an ID. In the context of NVMF, namespaces provide a way to enforce access control for the disks consumers. Namespaces are analogous to an OS partition, except the partitioning is clone in hardware by the controller and not the OS (you can still have OS partitions on namespaces). Some NVMe namespaces might be hidden from a user (e.g. for security isolation). A controller connects to a port through queues and a namespace through its namespace ID. A controller is allowed to connect to multiple namespaces and a namespace is allowed to be controlled by multiple controllers (and thus also, multiple ports). Imagine smearing out this NVMe device across multiple computers and you get to the next important concept, a storage fabric.

. . . When you put a network between the PCI bus and the storage device, you use NVMe over Fabric (aka NVMe-oF or simply NVMF). NVMF enables fast access between hosts and storage systems over a network. Compared to iSCSI, NVMF has much lower access latency, in practice adding only a small latency difference between local and remote storage. NVMF delivers a breakthrough in throughput and seek time relative to traditional device attached storage".

Cache Tier

Cache tiering involves providing fast and/or expensive storage devices such as solid state drives, which are configured to operate as a cache tier, in conjunction with a "backing pool" of erasure-coded or slower/less costly devices which serve as a storage tier which is more economical than the cache tier. For example, Mellanox provides a storage acceleration software product called VSA, which is a software platform built around the iSER technology. VSA is designed to support Use of Flash Memory or SSD as a caching tier.

ConnectX®

Layered storage is a known storage technology. For example, Mellanox's ConnectX® 40 Gb/s InfiniBand adapters deliver leading I/O performance for RAID's X2-IB which is a new InfiniBand layered storage solution.

Hyper-converged technology or hyperconvergence typically involves compute, storage, network and virtualization (all or any subset thereof) which are all converged into typically invisible infrastructure. The technology moves away from proprietary and costly storage arrays to open standard compute & storage architectures built around off-the-shelf commodity servers. Organizations may use commodity architecture to implement hyperconverged solutions that compete with large costly storage arrays, keeping up with the performance of typical storage platforms. Microsoft's Storage Spaces Direct (S2D) edition in Windows Server 2019 is an example of a hyperconverged solution.

It is appreciated that software components of the present invention may, if desired, be implemented in ROM (read only memory) form. The software components may, generally, be implemented in firmware or hardware, if desired, using conventional techniques. It is further appreciated that the software components may be instantiated, for example: as a computer program product, or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment, may also be provided separately, or in any suitable sub-combination.

It will be appreciated by persons skilled in the art that the present invention is not limited by what has been particularly shown and described hereinabove. Rather the scope of the invention is defined by the appended claims and equivalents thereof.

The invention claimed is:

1. A computerized system operating in conjunction with a computerized apparatus and with a fabric target service in data communication with the computerized apparatus, the system comprising:

functionality residing on the computerized apparatus; and
functionality residing on the fabric target service, which, when operating in combination, enable the computerized apparatus to coordinate access to data by:
creating an input-output memory management unit (IOMMU) domain that includes memory domains of plural virtual machines; and
translating at least one original address from a host request into an address that matches at least one of the plurality virtual machines' memories in the IOMMU domain, wherein the computerized apparatus is operative to copy, within a remote direct memory access (RDMA) protocol, the data from one buffer to another in the host, without the functionality residing on the fabric target service being aware of the copying.

2. A computerized system according to claim 1 which enables the host to access an emulated peripheral component interconnect (PCI) storage device, by employing said computerized apparatus for coordinating execution of the host request arriving on an emulated interface, wherein the host accesses the PCI storage device using less than three direct memory access (DMA) transfers, wherein the host request pertains to data stored or which is to be stored on at least one hardware storage device locally attached to the host, and wherein said data passes between the host's original application buffer and said hardware storage device locally attached to the host.

3. A computerized system according to claim 2 wherein the functionality residing on the computerized apparatus is operative to perform at least one of:
a. present an emulated storage device to a host;
b. get, from said host, requests posted on the emulated device;
c. parse the requests;
d. determine that one or more hardware storage device/s attached to the host are a source or a destination of at least a portion of the data referred to by the request, and, responsively, determine that said one or more storage devices attached to the host should be involved with said request; and
e. prepare at least one request having a local memory address, which address points to said original buffer located in the host's memory, for sending to said hardware storage device/s attached to the host.

4. A computerized system according to claim 3 wherein said request having a local memory address is formatted for a network storage protocol, and wherein the functionality residing on the fabric target service is operative to:
a. recognize said request having a local memory address by recognizing new opcodes or indication within existing opcode;
b. accordingly, generate a conventional request being formatted for a local storage protocol using pointers to original buffers received in the request having a local memory address; and
c. post said conventional request to a locally attached storage device governed by said local storage protocol, which will cause said locally attached storage device to initiate at least one DMA transfer of data between host buffers and internal flash storage.

5. A computerized system according to claim 4 and wherein said local storage protocol comprises a PCI storage protocol from the following group: NVMe, Virtio-blk, Virtio-scsi, small computer system interface (SCSI), serial advanced technology attachment (SATA), serial attached SCSI (SAS), and integrated drive electronics (IDE).

6. A computerized system according to claim 4 and wherein said network storage protocol comprises a block storage network storage protocol.

7. A computerized system according to claim 6 wherein said block storage network storage protocol comprises a remote direct memory access (RDMA) an RDMA network block storage protocol from the following group: non-volatile memory express over fabrics (NVMe-oF), iSCSI extensions for RDMA (iSER), and SCSI RDMA protocol (SRP).

8. A computerized system according to claim 2 wherein said hardware storage device comprises a physical non-volatile memory Express (NVMe) device which is in the same pass-through domain as said emulated PCI storage device, and wherein the host's original application buffer is described, both for the physical NVMe device and for said emulated PCI storage device, using the same address.

9. A computerized system according to claim 8 and having a physical NVMe side, wherein the original application buffer is part of a Virtual Machine (VM) memory space or VM domain, the emulated PCI storage device is in that VM domain, and wherein the physical NVMe device that is in the pass-through host domain, rather than in the VM domain, accesses the original application buffer by using Process Address Space ID (PASID) technology on the physical NVMe side.

10. A computerized system according to claim 9 wherein the host's original application buffer is part of a domain included in a Virtual Machine's memory space, the emulated PCI storage device is in said domain included in the Virtual Machine's memory space, and wherein a physical NVMe device which is in the pass-through host domain, rather than in said domain included in the Virtual Machine's memory space, accesses the original application buffer by virtue of said computerized apparatus converting VM addresses to host addresses, based on mapping passed into said computerized apparatus by a helper driver, on the host, that is exposed to guest-to-host memory maps of said Virtual Machine.

11. A computerized system according to claim 8 wherein the original application buffer is part of a Virtual Machine memory space or VM domain, the emulated PCI storage device is in said VM domain, and wherein the physical NVMe device accesses the original application buffer via the IOMMU domain and by deploying the physical NVMe device in the IOMMU domain.

12. A computerized system according to claim 8 wherein the original application buffer is part of a Virtual Machine memory space or VM domain, the emulated PCI storage device is in said VM domain, and wherein the physical NVMe device that is in a pass-through host domain rather than in said VM domain and accesses the original application buffer by using an Address Translation Service (ATS) to provide input-output memory management unit (IOMMU) translation of at least one address.

13. A computerized system according to claim 2 wherein the host accesses the PCI storage device using a single DMA transfer.

14. A computerized system according to claim 1 wherein said computerized apparatus includes:
a storage device emulator which emulates a storage device on a Peripheral Component Interconnect Express (PCIe) bus; and
the fabric target service, and wherein the storage device emulator comprises a drive emulator which emulates a drive on a PCIe bus.

15. A computerized system according to claim 14 wherein said drive emulator comprises an NVMe drive emulator which emulates an NVMe drive on a PCIe bus.

16. A computerized system according to claim 15 wherein the NVMe drive emulator employs software-defined network accelerated processing.

17. A computerized system according to claim 1 wherein the fabric target service is offered by the host, which is locally attached to a hardware storage device and also comprising a fabric target hardware offload which performs at least some functionality on behalf of the fabric target service and wherein translating the new opcode comprises replacing the vendor-specific opcode with at least one of a READ and WRITE command before submitting the at least one of a READ and WRITE command to the hardware storage device.

18. A method that enables a host to access an emulated PCI storage device, the method comprising:
employing a computerized apparatus for coordinating execution of a host request arriving on an emulated interface, while using less than three direct memory access (DMA) transfers, wherein the host request pertains to data stored or which is to be stored on at least one hardware storage device locally attached to the host, and wherein the host request comprises a vendor-specific opcode;
creating an input-output memory management unit (IOMMU) domain that includes memory domains of plural virtual machines;
translating at least one original address from the host request into an address that matches at least one of the plurality of virtual machines' memories in the IOMMU domain; and translating a new opcode into a different, existing, opcode, wherein the new opcode comprises a vendor-specific opcode, wherein said accessing includes enabling the storage device emulator to coordinate access to said data by using two direct memory access transfers of said data and wherein functionality residing on the storage device emulator is operative to:
a. present an emulated storage device to the host;
b. get, from said host, requests posted on the emulated device;
c. parse the requests; and
d. prepare a request formatted for a network storage protocol including a special memory key (MKEY) that points to host memory rather than to data processing unit (DPU) memory, thereby to facilitate, within a Remote Direct Memory Access (RDMA) protocol, simple copying of the data from one buffer to another in the host, without functionality residing on a fabric target service being aware of said simple copying.

19. A method according to claim 18 wherein the host accesses the emulated PCI storage device using plural direct memory access transfers, and wherein said accessing includes enabling the computerized apparatus to coordinate access of said data.

20. A method according to claim 18 wherein said data is stored on the storage device and said request comprises a read request in which data is transferred, via said direct memory access transfers, from the storage device to the host.

21. A method according to claim 18 wherein said request comprises a write request and said data is, via said write request, to be stored on the storage device thereby to transfer said data, via said direct memory access transfers, from the host to the storage device.

22. A method according to claim 18 wherein the functionality residing on the fabric target service is operative to:

a. get the request formatted for the network storage protocol from said functionality residing on the storage device emulator;
b. effect a DMA transfer of RDMA data to a staging buffer in host memory, which actually results in simple copying of the data from one buffer to another in the host, without the functionality residing on the fabric target service being aware of said simple copying;
c. generate a request formatted for a local storage protocol; and
d. post said request formatted for a local storage protocol, generated by the fabric target service, to a locally attached hardware drive formatted for the local storage protocol, which will cause said locally attached storage device to initiate DMAs of data between host buffers and internal flash storage.

23. A method according to claim 18 wherein the computerized apparatus comprises a DPU including a storage device emulator.

24. A method according to claim 23 wherein said hardware storage device comprises an NVMe, and said storage device emulator of said computerized apparatus comprises an NVMe drive emulator which emulates an NVMe drive on a PCIe bus.

25. A method according to claim 23 wherein said DPU locates at least a portion of the data referred to by a request, posted by a host via the emulated storage device, as available in, or targeted to, at least one storage device/s locally attached to the host, but not to the DPU.

26. A method according to claim 25 wherein the DPU uses a fabric target service offered by the host to access an individual host-attached storage device which is locally attached to the host, but not to the DPU, yielding a set of DMAs, including at least one, and no more than three, DMAs.

27. A method according to claim 23 wherein said hardware storage device comprises one of the following group: NVMe, Virtio-blk, Virtio-scsi, SCSI, SATA, SAS, IDE and said storage device emulator comprises one of the following group: NVMe, Virtio-blk, Virtio-scsi, small computer system interface (SCSI), serial advanced technology attachment (SATA), serial attached SCSI (SAS), and integrated drive electronics (IDE) drive emulator which emulates a storage drive on a peripheral component interconnect express (PCIe) bus.

28. A computerized system operating in conjunction with a computerized apparatus and with a fabric target service in data communication with the computerized apparatus, the system comprising:
functionality residing on the computerized apparatus; and
functionality residing on the fabric target service, which, when operating in combination, enable the computerized apparatus to coordinate access to data by recognizing and translating a new opcode into a different, existing, opcode and by accessing an application buffer of a Virtual Machine (VM) memory space or VM domain by using an address translation service (ATS) to provide input-output memory management unit (IOMMU) translation of at least one address in a host request, wherein the new opcode comprises an unrecognized and new vendor-specific opcode.

* * * * *